(12) United States Patent
Sugimori (10) Patent No.: US 10,479,314 B2
(45) Date of Patent: Nov. 19, 2019

(54) CURTAIN AIRBAG AND CURTAIN AIRBAG DEVICE

(71) Applicant: JOYSON SAFETY SYSTEMS JAPAN K.K., Tokyo (JP)

(72) Inventor: Sakae Sugimori, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 73 days.

(21) Appl. No.: 15/912,912

(22) Filed: Mar. 6, 2018

(65) Prior Publication Data

US 2018/0257600 A1 Sep. 13, 2018

(30) Foreign Application Priority Data

Mar. 8, 2017 (JP) .................................. 2017-043396

(51) Int. Cl.
*B60R 21/232* (2011.01)
*B60R 21/2338* (2011.01)
*B60R 21/231* (2011.01)

(52) U.S. Cl.
CPC ........ *B60R 21/232* (2013.01); *B60R 21/2338* (2013.01); *B60R 21/23138* (2013.01); *B60R 2021/23386* (2013.01)

(58) Field of Classification Search
CPC .............. B60R 21/232; B60R 21/2338; B60R 21/23138; B60R 2021/23386
See application file for complete search history.

(56) References Cited

U.S. PATENT DOCUMENTS

| | | | | |
|---|---|---|---|---|
| 9,114,776 B2* | 8/2015 | Thomas | .............. | B60R 21/2338 |
| 9,487,179 B2 | 11/2016 | Takedomi et al. | | |
| 2005/0206138 A1* | 9/2005 | Breuninger | ........... | B60R 21/231 |
| | | | | 280/729 |
| 2005/0218639 A1* | 10/2005 | Maertens | .............. | B60R 21/232 |
| | | | | 280/743.1 |
| 2010/0032930 A1* | 2/2010 | Yamamura | ............ | B60R 21/232 |
| | | | | 280/730.2 |
| 2014/0217709 A1* | 8/2014 | Fukawatase | .......... | B60R 21/232 |
| | | | | 280/730.2 |

(Continued)

FOREIGN PATENT DOCUMENTS

DE 10 2005 002 085 B4 9/2013
EP 2 390 144 A1 11/2011

(Continued)

*Primary Examiner* — Drew J Brown
(74) *Attorney, Agent, or Firm* — Foley & Lardner LLP (57) ABSTRACT

A curtain airbag and device capable of stabilizing a position of a main panel in a vehicle length direction (longitudinal direction) and in a vehicle width direction (lateral direction) at the time of inflation and development. A curtain airbag is provided with a main panel forming an inflatable portion, a guide panel arranged on a rear surface arranged on a side window side of the main panel, and a connecting member which connects the main panel to a vehicle body, the main panel including a folded portion obtained by folding a lower end in a flat development view toward the rear surface side, the guide panel including an upper end connected to the main panel and a lower end connected to the folded portion, and the connecting member including a first end connected to the vehicle body and a second end connected to the folded portion.

4 Claims, 6 Drawing Sheets

(56) References Cited

U.S. PATENT DOCUMENTS

2014/0217710 A1\* 8/2014 Fukawatase .......... B60R 21/233
                                                    280/730.2
2017/0182967 A1\* 6/2017 Suzuki .................. B60R 21/213

FOREIGN PATENT DOCUMENTS

| JP | 2006-298334 A | 11/2006 |
| JP | 4432699 B2 | 3/2010 |
| JP | 4507848 B2 | 7/2010 |
| JP | 2014-091420 A | 5/2014 |
| JP | 2015-080993 A | 4/2015 |
| WO | WO-2013/108474 A1 | 7/2013 |
| WO | WO-2014/042040 A1 | 3/2014 |
| WO | WO-2015/059977 A1 | 4/2015 |

\* cited by examiner

CURTAIN AIRBAG AND CURTAIN AIRBAG DEVICE

RELATED APPLICATIONS

The present application claims priority to Japanese Patent Application No. 2017-043396, filed Mar. 8, 2017. The content of this application is hereby incorporated by reference in its entirety.

BACKGROUND

Technical Field

The present invention relates to a curtain airbag and a curtain airbag device, and especially relates to a curtain airbag and a curtain airbag device suitable for stabilizing an inflated and developed position of the curtain airbag.

Related Art

Generally, a vehicle such as an automobile is equipped with an airbag device for absorbing an impact to an occupant by inflating and developing an airbag in a vehicle in an emergency such as collision or rollover. Especially, a curtain airbag device covering a side window may be mounted in order to suppress the occupant from being thrown out of the vehicle at the time of rollover of the vehicle or the like.

Such curtain airbag device is generally provided with a curtain airbag folded to be stored in an upper portion of a vehicle body in normal times and inflated and developed along the side window in an emergency, and an inflator which supplies gas to the curtain airbag. In an emergency, gas is supplied from the inflator to the curtain airbag, and the curtain airbag is discharged into the vehicle along the side window to be inflated and developed.

At the time of rollover or oblique collision of the vehicle, an occupant might move toward an A pillar (front pillar) of the vehicle, so that it is necessary to suppress the occupant from colliding with the A pillar and being thrown out of the vehicle from the vicinity of the A pillar. Therefore, in order to inflate and develop the curtain airbag in an appropriate position, a connecting member such as a tether for connecting to the A pillar is arranged at a front end of the curtain airbag (refer to, for example, JP 2014-91420 A or JP 2015-80993 A).

In the curtain airbag disclosed in JP 2014-91420 A, the connecting member is arranged on the guide panel arranged on the rear surface of the curtain airbag, and in the curtain airbag disclosed in JP 2015-80993 A, the connecting member is arranged substantially at the center in the height direction of the curtain airbag.

SUMMARY OF THE INVENTION

However, in the curtain airbag disclosed in JP 2014-91420 A, since the main panel forming the inflatable portion is indirectly pulled via the guide panel, the guide panel might be extended or deformed, so that there is a problem that it is desired to further stabilize the position in the vehicle length direction (longitudinal direction) of the main panel.

Also, in the curtain airbag disclosed in JP 2015-80993 A, since the substantially central portion of the main panel forming the inflatable portion is directly pulled, the curtain airbag which is to be inflated and developed in the vehicle interior side moves toward the side window side, so that there is a problem that it is desirable to further stabilize the position of the main panel in the vehicle width direction (lateral direction).

The present invention is achieved in view of the above-described problem, and an object thereof is to provide a curtain airbag and a curtain airbag device capable of stabilizing a position of a main panel in a vehicle length direction (longitudinal direction) and a vehicle width direction (lateral direction) at the time of inflation and development.

According to the present invention, provided is a curtain airbag folded to be stored in an upper portion of a vehicle body in normal times and inflated and developed along a side window in an emergency, the curtain airbag provided with a main panel forming an inflatable portion, a guide panel arranged on a rear surface arranged on a side of the side window of the main panel, and a connecting member which connects the main panel to the vehicle body, in which the main panel includes a folded portion obtained by folding a lower end in a flat development view toward the rear surface side, the guide panel includes an upper end connected to the main panel and a lower end connected to the folded portion, and the connecting member includes a first end connected to the vehicle body and a second end connected to the folded portion.

According to the present invention, provided is a curtain airbag device including curtain airbag folded to be stored in an upper portion of a vehicle body in normal times and inflated and developed along a side window in an emergency and an inflator which supplies gas to the curtain airbag, the curtain airbag including a main panel forming an inflatable portion, a guide panel arranged on a rear surface arranged on a side of the side window of the main panel, and a connecting member which connects the main panel to the vehicle body, in which the main panel includes a folded portion obtained by folding a lower end in a flat development view toward the rear surface side, the guide panel includes an upper end connected to the main panel and a lower end connected to the folded portion, and the connecting member includes a first end connected to the vehicle body and a second end connected to the folded portion.

In the above-described curtain airbag and curtain airbag device, for example, the first end is connected to an A pillar of the vehicle body and the second end is connected to a front end of the folded portion.

The first end may also be located above the second end in a state where the main panel is inflated and developed.

According to the curtain airbag and the curtain airbag device of the present invention described above, the lower end of the main panel forming the inflatable portion of the curtain airbag is folded and the connecting member is arranged at the folded portion, so that the main panel may be pulled directly by the connecting member at the time of inflation and development of the curtain airbag, and the position of the main panel in the vehicle length direction (longitudinal direction) may be stabilized at the time of inflation and development.

At the time of inflation and development of the curtain airbag, since the connecting member is arranged at a position closer to the side window side than the inflatable portion in contact with the occupant, the position of the main panel in the vehicle width direction (lateral direction) at the time of inflation and development may be stabilized.

BRIEF DESCRIPTION OF DRAWINGS

FIGS. 1A and 1B are plan views illustrating a curtain airbag according to a first embodiment of the present invention, in which FIG. 1A illustrates a main panel, and FIG. 1B illustrates a guide panel.

FIGS. 2A to 2D are views illustrating a method of manufacturing the curtain airbag illustrated in FIGS. 1A and 1B, in which FIG. 2A illustrates a first step of forming a folded portion, FIG. 2B illustrates a second step of connecting the guide panel, FIG. 2C is an enlarged cross-sectional view taken along line C-C in FIG. 2A, and FIG. 2D is an enlarged cross-sectional view taken along line D-D in FIG. 2B.

FIGS. 3A and 3B are views illustrating an inflating and developing behavior of the curtain airbag illustrated in FIGS. 1A and 1B, in which FIG. 3A illustrates a storage state, and FIG. 3B illustrates an inflated/developed state.

FIGS. 4A and 4B are views illustrating an inflated and developed state of the curtain airbag illustrated in FIGS. 1A and 1B, in which FIG. 4A is a partially enlarged view, and FIG. 4B is a conceptual diagram.

FIGS. 5A to 5C are plan views illustrating a curtain airbag according to a second embodiment of the present invention, in which FIG. 5A illustrates a main panel, FIG. 5B illustrates a first guide panel, and FIG. 5C illustrates a second guide panel.

FIGS. 6A to 6D are views illustrating a method of manufacturing the curtain airbag illustrated in FIGS. 5A to 5C, in which FIG. 6A illustrates a first step of forming a folded portion, FIG. 6B illustrates a second step of connecting a guide panel, FIG. 6C is an enlarged cross-sectional view taken along line C-C in FIG. 5A, and FIG. 6D is an enlarged cross-sectional view taken along line D-D in FIG. 5B.

DETAILED DESCRIPTION

Figure 1A:
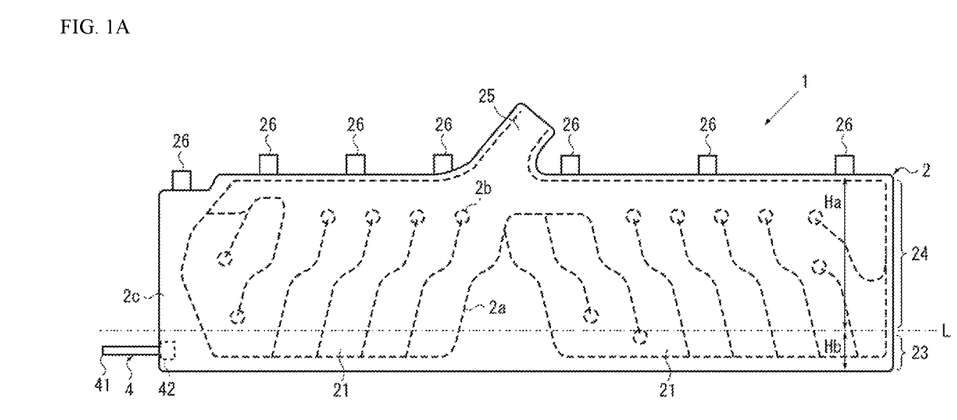
Figure 1B:
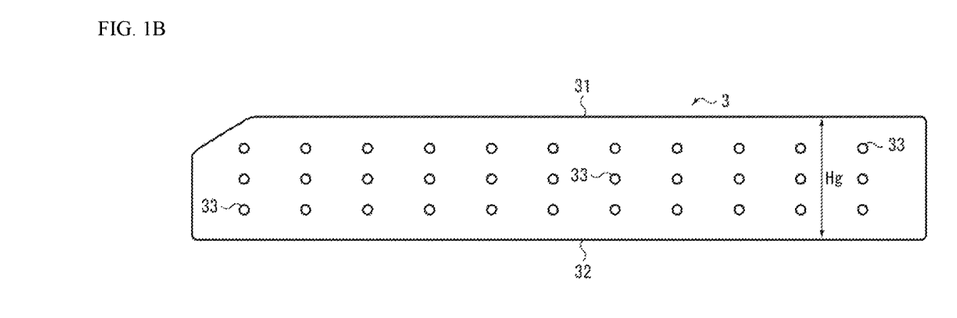
Figure 2A:
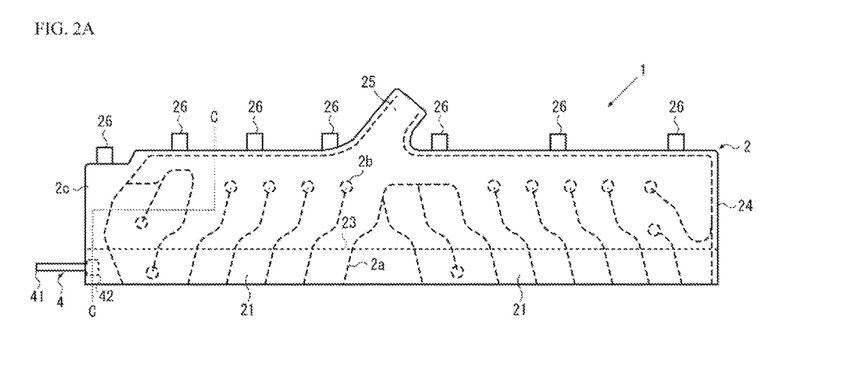
Figure 2B:
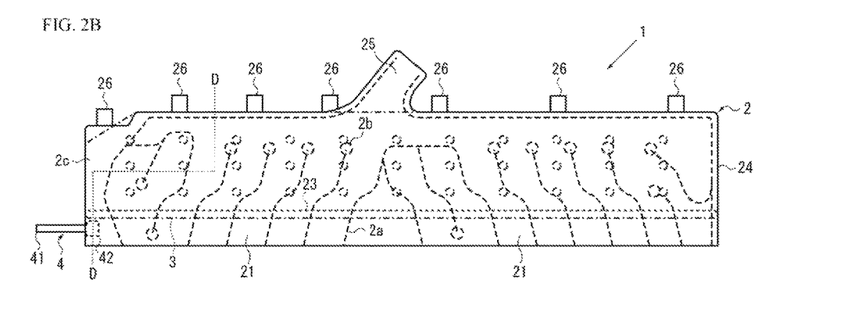
Figure 2C:
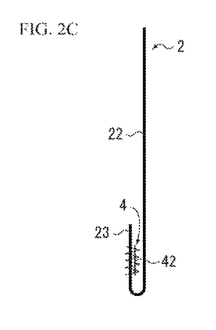
Figure 2D:
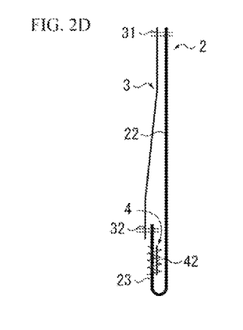

Hereinafter, embodiments of the present invention are described with reference to FIGS. 1A to 6D. Herein, FIGS. 1A and 1B are plan views illustrating a curtain airbag according to a first embodiment of the present invention, in which FIG. 1A illustrates a main panel, and FIG. 1B illustrates a guide panel. FIGS. 2A to 2D are views illustrating a method of manufacturing the curtain airbag illustrated in FIGS. 1A and 1B, in which FIG. 2A illustrates a first step of forming a folded portion, FIG. 2B illustrates a second step of connecting the guide panel, FIG. 2C is an enlarged cross-sectional view taken along line C-C in FIG. 2A, and FIG. 2D illustrates an enlarged cross-sectional view taken along line D-D in FIG. 2B.

As illustrated in FIG. 1A to FIG. 2D, a curtain airbag 1 according to the first embodiment of the present invention is provided with a main panel 2 forming an inflatable portion 21, a guide panel 3 arranged on a rear surface 22 arranged on a side window side of the main panel 2, and a connecting member 4 which connects the main panel 2 to a vehicle body, the main panel 2 including a folded portion 23 obtained by folding a lower end in a flat development view toward the rear surface 22 side, the guide panel 3 including an upper end 31 connected to the main panel 2 and a lower end 32 connected to the folded portion 23, and the connecting member 4 including a first end 41 connected to the vehicle body and a second end 42 connected to the folded portion 23.

The main panel 2 is formed by overlapping two base fabrics and sewing along a predetermined seam 2a as illustrated in FIG. 1A, for example. The inflatable portion 21 is arbitrarily formed by the seam 2a and fastening points 2b, and a shape thereof is not limited to the illustrated shape.

The main panel 2 is also provided with a gas supply port 25 for supplying gas into the inflatable portion 21 and a plurality of tabs 26 arranged on an upper end thereof. An inflator capable of discharging gas when the curtain airbag 1 is inflated and developed is connected to the gas supply port 25. Also, the tabs 26 are connected to an upper portion of the vehicle body (for example, a roof side rail).

A dashed-dotted line in the lower end of the main panel 2 is a folding line L. A portion below the folding line L is a portion corresponding to the folded portion 23. The folded portion 23 is formed to include, for example, at least a part of the inflatable portion 21. Meanwhile, in this specification, for convenience of description, a portion above the folding line L is referred to as a main body portion 24.

The guide panel 3 is arranged on the rear surface 22 of the main panel 2 as illustrated in FIG. 2(D), for example. Assuming that a height of the main body portion 24 is Ha and a height of the folded portion 23 is Hb as illustrated in FIG. 1A, a height Hg of the guide panel 3 illustrated in FIG. 1B is set as Hg=Ha−Hb (excluding seam allowance). By forming such that the height Hg of the guide panel 3 is shorter than the height Ha of the main body portion 24 in this manner, it is possible to bend the substantially central portion of the main panel 2 toward a vehicle interior side when the curtain airbag 1 is inflated and developed.

The guide panel 3 has an outer shape that covers substantially an entire surface of the rear surface 22 of the main panel 2 (main body portion 24) and is provided with a plurality of openings 33 as illustrated in FIG. 1B, for example. By forming such openings 33, it is possible to allow air to flow between the main panel 2 and the guide panel 3 when the curtain airbag 1 is inflated and developed, so that it is possible to inhibit the guide panel 3 from sticking. Meanwhile, the outer shape of the guide panel 3 is not limited to the illustrated shape as long as the main panel 2 may be bent, and this may also be divided into a plurality of parts.

The connecting member 4 has a rectangular shape extending in a longitudinal direction of the vehicle as illustrated in FIG. 1A, for example. The connecting member 4 is also provided with the first end 41 located on a vehicle front side and the second end 42 located on a vehicle rear side, the second end 42 sewn to a front end of the folded portion 23. Specifically, the second end 42 is sewn to a surplus portion 2c formed on an outer periphery of the inflatable portion 21 when the inflatable portion 21 is formed on the main panel 2. Meanwhile, a shape of the connecting member 4 is not limited to the rectangular shape, and this may also be a panel shape or a string shape.

In such curtain airbag 1, the folded portion 23 is folded along the folding line L illustrated in FIG. 1A toward the rear surface 22 side of the main panel 2 as illustrated in FIGS. 2A and 2C. At that time, the connecting member 4 is also folded toward the rear surface 22 side of the main panel 2.

Next, the upper end 31 of the guide panel 3 is sewn to an upper portion of the rear surface 22 of the main panel 2, and the lower end 32 of the guide panel 3 is sewn to an upper portion of the folded portion 23 as illustrated in FIGS. 2B and 2D. Meanwhile, in FIG. 2B, for convenience of description, the guide panel 3 is indicated by a dashed-dotted line.

Thereafter, although not illustrated, the curtain airbag 1 is folded into a rod shape by roll-folding a lower portion and bellows-folding an upper portion, and a folded shape thereof is held by a wrapping member or the like. Meanwhile, a method of folding the curtain airbag 1 is not limited to a combination of the roll-folding and the bellows-folding. Although not illustrated, the inflator is connected to the gas supply port 25.

Figure 3A:
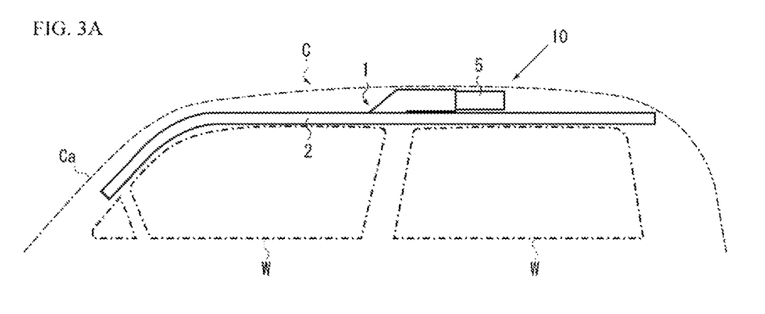
Figure 3B:
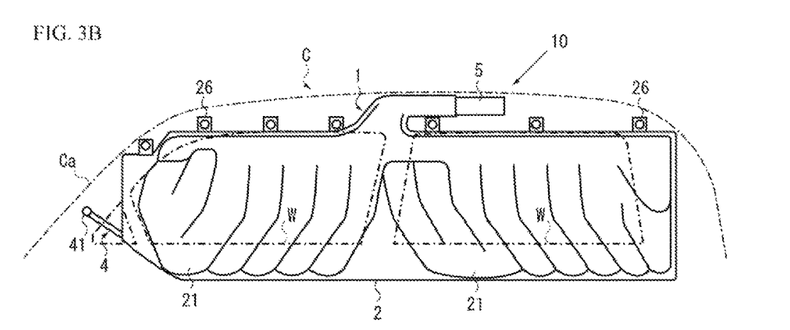
Figure 4A:
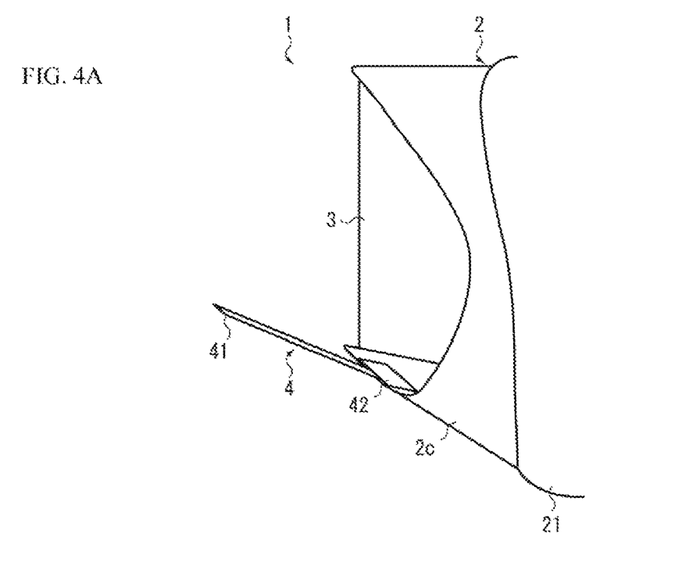
Figure 4B:
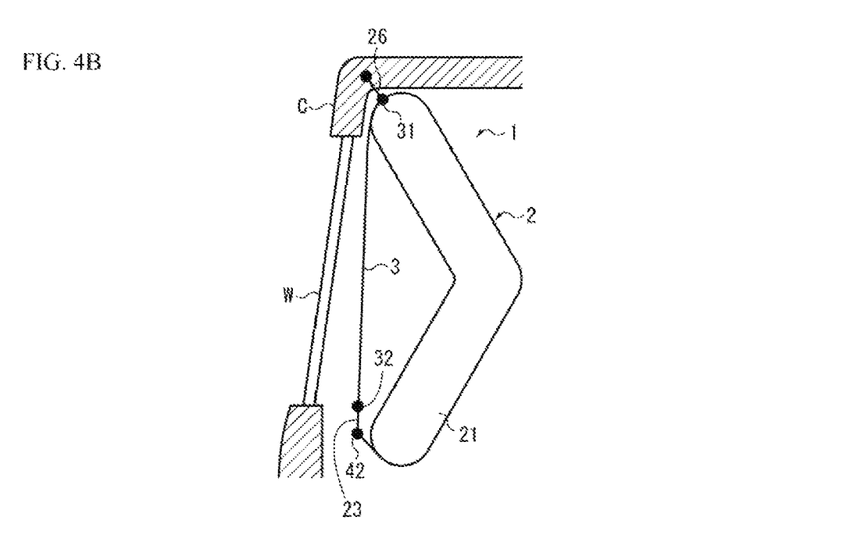

Herein, FIGS. 3A and 3B are views illustrating an inflating and developing behavior of the curtain airbag illustrated in FIGS. 1A and 1B, in which FIG. 3A illustrates a storage state, and FIG. 3B illustrates an inflated/developed state. FIGS. 4A and 4B are views illustrating the inflated and developed state of the curtain airbag illustrated in FIGS. 1A and 1B, in which FIG. 4A is a partially enlarged view, and FIG. 4B is a conceptual diagram. Meanwhile, in FIGS. 3A and 3B, for convenience of description, the vehicle body is indicated by a dashed-dotted line.

A curtain airbag device 10 according to this embodiment is provided with the curtain airbag 1 and an inflator 5 for supplying gas to the curtain airbag 1 as illustrated in FIGS. 3A and 3B. The curtain airbag 1 is folded in the rod shape and stored in the upper portion of a vehicle body C in normal times as illustrated in FIG. 3A, and this is inflated and developed along a side window W in an emergency as illustrated in FIG. 3B.

As illustrated in FIG. 3B, the inflator 5 and the tab 26 are fixed to the roof side rail of the vehicle body C, and the first end 41 of the connecting member 4 is connected to an A pillar Ca of the vehicle body C. At that time, the first end 41 of the connecting member 4 may be connected to be located above the second end 42 in a state in which the main panel 2 is inflated and developed. By arranging the first end 41 above the second end 42 in this manner, the lower end of the curtain airbag 1 may be pulled upward, and a state in which the connecting member 4 is located on the rear surface 22 side of the main panel 2 may be held.

In an emergency such as at the time of vehicle collision, the inflator 5 operates and gas is supplied to the inflatable portion 21 of the main panel 2, and the curtain airbag 1 is released from the folded state and discharged into the vehicle to be inflated and developed along the side window W as illustrated in FIG. 3B. At that time, since the folded portion 23 is formed on the main panel 2, and the guide panel 3 is connected to the folded portion 23, the main panel 2 is inflated and developed in a state bent toward the vehicle interior side as illustrated in FIG. 4 (B), for example.

Since the second end 42 of the connecting member 4 is sewn to the folded portion 23 of the curtain airbag 1, at least the surplus portion 2c of the portion to which the connecting member 4 is connected out of the folded portion 23 is pulled toward the rear surface 22 side of the main panel 2 as illustrated in FIGS. 4A and 4B. As a result, when the curtain airbag 1 is inflated and developed, the second end 42 of the connecting member 4 is located on the rear surface 22 of the main panel 2, that is, between the side window W and the main panel 2.

Therefore, when the curtain airbag 1 is inflated and developed, the main panel 2 may be directly pulled by the connecting member 4, and it is possible to stabilize the position of the main panel 2 in a vehicle length direction (longitudinal direction) at the time of inflation and development.

Also, since the connecting member 4 is connected to the folded portion 23 which is inflated and developed at a position closer to the side window W side than the main body portion 24, it is possible to reduce tension to pull the main panel 2 toward the side window W and it is possible to stabilize the position of the main panel 2 in a vehicle width direction (lateral direction) at the time of inflation and development.

Figure 5A:
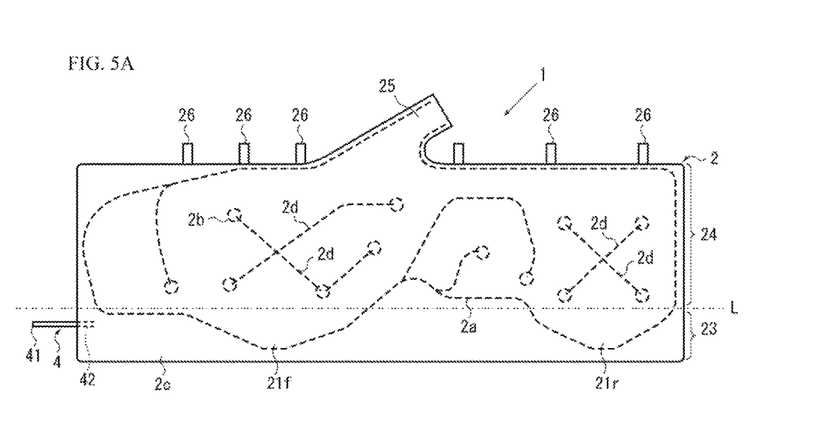
Figure 5B:
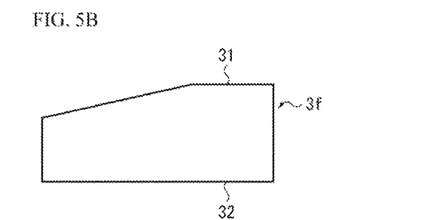
Figure 5C:
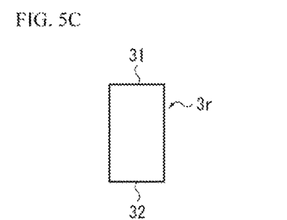
Figure 6A:
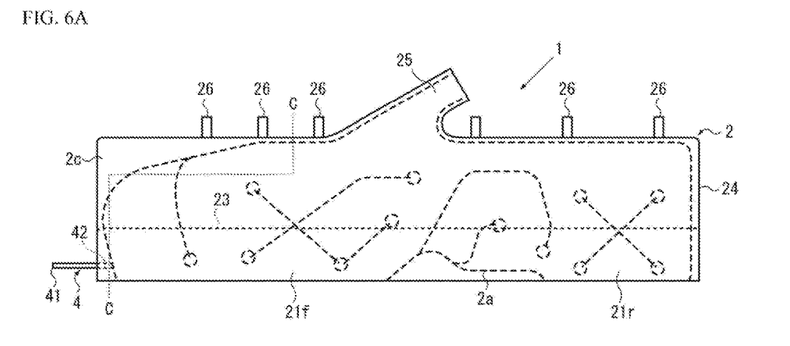
Figure 6B:
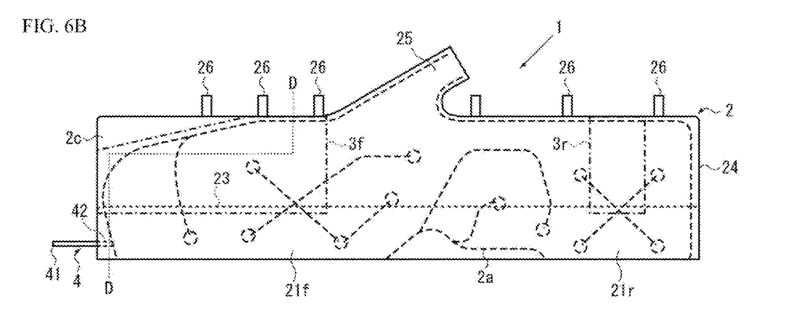
Figure 6C:
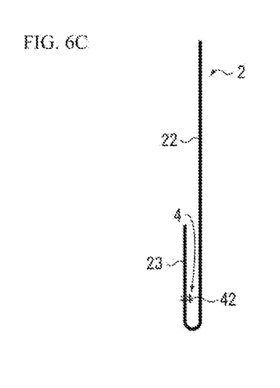
Figure 6D:
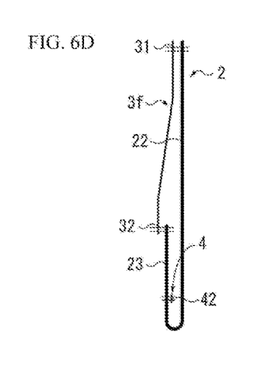

Next, a curtain airbag 1 according to a second embodiment of the present invention is described with reference to FIGS. 5A to 6D. Herein, FIGS. 5A to 5C are plan views illustrating the curtain airbag according to the second embodiment of the present invention, in which FIG. 5A illustrates a main panel, FIG. 5B illustrates a first guide panel, and FIG. 5C illustrates a second guide panel. FIGS. 6A to 6D are views illustrating a method of manufacturing the curtain airbag illustrated in FIGS. 5A to 5C, in which FIG. 6A illustrates a first step of forming a folded portion, FIG. 6B illustrates a second step of connecting the guide panel, FIG. 6C is an enlarged cross-sectional view taken along line C-C in FIG. 5A, and FIG. 6D illustrates an enlarged cross-sectional view taken along line D-D in FIG. 5B. Meanwhile, the same components as those of the curtain airbag 1 according to the above-described first embodiment are assigned with the same reference signs, and the description thereof is not repeated.

The curtain airbag 1 according to the second embodiment is different from the curtain airbag 1 according to the first embodiment in a shape of an inflatable portion 21 formed on a main panel 2 and a shape of a guide panel 3.

The main panel 2 is provided with a front chamber 21f and a rear chamber 21r having a substantially X-shaped seam 2d as illustrated in FIG. 5A. By forming the inflatable portion with such seam 2d, the front chamber 21f and the rear chamber 21r may be inflated and developed three-dimensionally, and a substantially planar portion for receiving an occupant may be formed on a vehicle interior side.

The guide panel 3 is provided with a first guide panel 3f arranged in the front chamber 21f and a second guide panel 3r arranged in the rear chamber 21r as illustrated in FIGS. 5 (B) and 5 (C). The guide panel 3 may also be divided into a plurality of panels in this manner. In a case where a surface area is small as in the first guide panel 3f and the second guide panel 3r, a sticking force to a rear surface 22 of the main panel 2 at the time of inflation and development of the curtain airbag 1 is weak, so that an opening may be omitted.

As illustrated in FIG. 5A, the curtain airbag 1 according to the second embodiment also includes a folded portion 23 folded toward the rear surface 22 side of the main panel 2 at a folding line L, and a second end 42 of a connecting member 4 is sewn to the folded portion 23. The folded portion 23 is formed so as to include at least a part of the inflatable portion 21 as illustrated.

In such curtain airbag 1, the folded portion 23 is folded along the folding line L illustrated in FIG. 5A toward the rear surface 22 side of the main panel 2 as illustrated in FIGS. 6A and 6C. At that time, the connecting member 4 is also folded toward the rear surface 22 side of the main panel 2.

Next, as illustrated in FIGS. 6B and 6D, an upper end 31 of the first guide panel 3f and the second guide panel 3r is sewn to an upper portion of the rear surface 22 of the main panel 2, and a lower end 32 of the first guide panel 3f and the second guide panel 3r is sewn to an upper portion of the folded portion 23. Meanwhile, in FIG. 6B, for convenience of description, the first guide panel 3f and the second guide panel 3r are indicated by dashed-dotted lines.

Thereafter, although not illustrated, the curtain airbag 1 is folded into a rod shape by roll-folding a lower portion and bellows-folding an upper portion, and a folded shape thereof is held by a wrapping member or the like. Meanwhile, a method of folding the curtain airbag 1 is not limited to a combination of the roll-folding and the bellows-folding. Although not illustrated, the inflator is connected to the gas supply port 25.

An inflating and developing behavior of the curtain airbag 1 according to the second embodiment is substantially the same as that of the curtain airbag 1 according to the first embodiment, and a front portion of the curtain airbag 1 according to the second embodiment is inflated and developed as illustrated in FIGS. 4A and 4B, and has the same action and effect as those of the curtain airbag 1 according to the first embodiment.

Although a case of applying to the curtain airbag 1 inflated and developed so as to be bent is described in the above-described first embodiment, and a case of applying to the curtain airbag 1 inflated and developed in a three-dimensional manner is described in the second embodiment, the present invention may also be applied to a curtain airbag having an inflatable portion different from them.

Although a case where the connecting member 4 connects the A pillar Ca to the front end of the main panel 2 is described in the above-described first and second embodiments, the connecting member 4 may also connect, for example, a C pillar or a rear pillar to a rear end of the main panel 2.

The present invention is not limited to the above-described embodiments, and it goes without saying that various modifications may be made without departing from the spirit of the present invention.

What is claimed is:

1. A curtain airbag folded to be stored in an upper portion of a vehicle body in normal times and inflated and developed along a side window in an emergency, the curtain airbag comprising:
    a main panel forming an inflatable portion;
    a guide panel arranged on a rear surface arranged on a side of the side window of the main panel; and
    a connecting member which connects the main panel to the vehicle body,
    wherein the main panel includes a folded portion obtained by folding a lower end in a flat development view toward the rear surface side,
    the guide panel includes an upper end connected to the main panel and a lower end connected to the folded portion, and
    the connecting member includes a first end connected to the vehicle body and a second end connected to the folded portion.

2. The curtain airbag according to claim 1, wherein the first end is connected to an A pillar of the vehicle body, and the second end is connected to a front end of the folded portion.

3. The curtain airbag according to claim 1, wherein the first end is located above the second end in a state where the main panel is inflated and developed.

4. A curtain airbag device comprising a curtain airbag folded to be stored in an upper portion of a vehicle body in normal times and inflated and developed along a side window in an emergency, and an inflator which supplies gas to the curtain airbag,
    wherein the curtain airbag is the curtain airbag according to claim 1.

* * * * *